US011088734B2

(12) United States Patent
Guerra et al.

(10) Patent No.: US 11,088,734 B2
(45) Date of Patent: Aug. 10, 2021

(54) EFFICIENT CHANNEL ESTIMATION FOR IMPLICIT MU-MIMO

(71) Applicant: SKYLARK WL HOLDINGS, LLC, Houston, TX (US)

(72) Inventors: Ryan E. Guerra, Houston, TX (US); Clayton W. Shepard, Houston, TX (US); Narendra Anand, Sunnyvale, CA (US); Edward Knightly, Houston, TX (US); Lin Zhong, Houston, TX (US)

(73) Assignee: Skylark WL Holdings, LLC, Houston, TX (US)

( * ) Notice: Subject to any disclaimer, the term of this patent is extended or adjusted under 35 U.S.C. 154(b) by 63 days.

(21) Appl. No.: 16/096,514

(22) PCT Filed: Aug. 25, 2017

(86) PCT No.: PCT/US2017/048557
§ 371 (c)(1),
(2) Date: Oct. 25, 2018

(87) PCT Pub. No.: WO2018/039527
PCT Pub. Date: Mar. 1, 2018

(65) Prior Publication Data
US 2019/0140709 A1 May 9, 2019

Related U.S. Application Data

(60) Provisional application No. 62/379,351, filed on Aug. 25, 2016.

(51) Int. Cl.
*H04L 25/02* (2006.01)
*H04B 7/0452* (2017.01)
(Continued)

(52) U.S. Cl.
CPC ........... *H04B 7/0452* (2013.01); *H04B 7/043* (2013.01); *H04B 7/0421* (2013.01);
(Continued)

(58) Field of Classification Search
CPC .... H04B 7/043; H04W 16/28; H04L 25/0224; H04L 25/0226
See application file for complete search history.

(56) References Cited

U.S. PATENT DOCUMENTS 8,644,368 B1 * 2/2014 Zhang ................. H04B 7/0413
375/219
2007/0268181 A1 * 11/2007 Howard ................ H01Q 21/00
342/368
(Continued)

*Primary Examiner* — Salvador E Rivas
(74) *Attorney, Agent, or Firm* — Kearney, McWilliams & Davis, PLLC; William C. Yarbrough

(57) ABSTRACT

Base stations for MIMO wireless systems embodying efficient channel estimation techniques. One illustrative embodiment includes: an array of multiple antennas to exchange uplink and downlink signals with spatially-distributed user terminals; multiple transmit chains, each coupled to one of the multiple antennas by a respective transceiver that also couples that antenna to a respective one of multiple receive chains; and a controller. Each of the receive chains opportunistically derives estimated uplink channel response coefficients from packet headers in the wireless uplink signals, and the controller determines a steering transform based at least in part on the estimated channel response coefficients. The transmit chains apply the steering transform to spatially-distinct downlink signals to produce antenna-specific downlink signals for each antenna in the array. Another illustrative embodiment determines, based at least in part on the estimated channel response coefficients, a mobility indicator for each user terminal, and, based on the mobility indicators, schedules at least one action.

28 Claims, 6 Drawing Sheets

(51) Int. Cl.
    *H04B 7/0426*     (2017.01)
    *H04B 7/0417*     (2017.01)
    *H04W 16/28*     (2009.01)
    *H04W 84/12*     (2009.01)
    *H04W 88/08*     (2009.01)

(52) U.S. Cl.
    CPC ...... *H04L 25/0202* (2013.01); *H04L 25/0224* (2013.01); *H04W 16/28* (2013.01); *H04W 84/12* (2013.01); *H04W 88/08* (2013.01)

(56) References Cited

U.S. PATENT DOCUMENTS

| | | | |
|---|---|---|---|
| 2012/0039196 A1* | 2/2012 | Zhang | H04B 7/0619 370/252 |
| 2012/0051287 A1* | 3/2012 | Merlin | H04L 25/0228 370/328 |
| 2013/0157660 A1* | 6/2013 | Awad | H04W 72/046 455/435.1 |
| 2014/0327579 A1* | 11/2014 | Hart | H04W 64/006 342/374 |

* cited by examiner

EFFICIENT CHANNEL ESTIMATION FOR IMPLICIT MU-MIMO

CROSS-REFERENCE TO RELATED APPLICATIONS

The present application claims priority to Provisional U.S. Application 62/379,351, titled "Efficient Channel Estimation for Implicit MU-MIMO" and filed 25 Aug. 2016 and Non-Provisional application Ser. No. 16/096,514, naming as inventors Ryan E. Guerra, Clayton W. Shepard, Narendra Anand, Edward Knightly, and Lin Zhong.

ACKNOWLEDGEMENT OF GOVERNMENT SUPPORT

This invention was made with government support under one or more contracts (Contract Numbers 1126478, 1218700, 1405937, 1444056, 1514285, 1518916, and/or 1520496) awarded by the National Science Foundation. The government has certain rights in the invention.

BACKGROUND

Wireless networks have become pervasive, enabling a wide variety of electronic devices to communicate wirelessly with each other and to access the Internet. The number of devices and their individual bandwidth requirements continue to increase, motivating engineers to develop new communications technologies to exploit the available bandwidth in ever-more-efficient ways.

In particular, multi-user multi-input multi-output (MU-MIMO) technologies enable user terminals and base stations, each having one or more antennas, to establish wireless links for communicating with each other. As used herein, the term channel state information (CSI) refers to the properties of the communication channel(s) that the wireless links provide. The CSI serves as a model representing how a signal propagates from the transmitter to the receiver, accounting for the combined effects of, for example, scattering, fading, and power decay with distance. Wireless communication technologies such as MU-MIMO routinely measure CSI so as to adapt transmissions to current channel conditions, which is crucial for achieving reliable communication with high data rates.

In wireless communication networks, the CSI becomes sensitive to movement of the user terminals and other changes to environmental conditions, necessitating that the CSI measurement procedure be repeated frequently. The CSI measurement process for MU-MIMO systems can be implemented in various ways, but the existing MU-MIMO CSI measurement processes require a portion of the channel bandwidth be allocated as fixed overhead for CSI measurement. As provided in the existing IEEE 802.11af standard, the required overhead allocation grows proportionally with the number of user terminal antennas K (and in one implementation, also grows proportionally with the number of base station antennas M), and in at least some cases the overhead approaches 90% of the available channel bandwidth, severely restricting data throughput.

SUMMARY

Accordingly, there are disclosed herein efficient channel estimation techniques for multi-user multi-input multi-output (MU-MIMO) wireless systems, along with illustrative user terminal devices and base stations that embody these techniques.

One illustrative wireless communications base station embodiment includes: an array of multiple antennas to exchange uplink and downlink signals with spatially-distributed user terminals; multiple transmit chains, each coupled to one of the multiple antennas by a respective transceiver that also couples that antenna to a respective one of multiple receive chains; and a controller. Each of the receive chains derives estimated uplink channel response coefficients from packet headers in the wireless uplink signals, and the controller determines a steering transform based at least in part on the estimated channel response coefficients. The transmit chains apply the steering transform to spatially-distinct downlink signals to produce antenna-specific downlink signals for each antenna in the array.

Another illustrative wireless communications base station embodiment includes: an array of multiple antennas to exchange uplink and downlink signals with spatially-distributed user terminals; multiple transmit chains, each coupled to one of the multiple antennas by a respective transceiver that also couples that antenna to a respective one of multiple receive chains; and a controller. Each receive chain derives estimated uplink channel response coefficients from the wireless uplink signals, and based on these coefficients the controller determines a steering transform to be applied by the transmit chains to spatially-distinct downlink signals to produce antenna-specific downlink signals for each antenna in the array. The controller further determines, based at least in part on the estimated channel response coefficients, a mobility indicator for each user terminal, and, based on the mobility indicators, schedules at least one action in a set consisting of: uplink pilot signals from one or more of the user stations, and re-deriving the estimated uplink channel response coefficients.

An illustrative embodiment of a disclosed wireless network communications method includes: exchanging wireless uplink and downlink signals with spatially-distributed user terminals; deriving, for each combination of user terminal antenna and base station antenna, an estimated uplink channel response coefficient from packet headers in the wireless uplink signals; determining a steering transform based at least in part on the estimated uplink channel response coefficients; and applying the steering transform to spatially-distinct downlink signals to produce antenna-specific downlink signals for each antenna of a multi-antenna base station, thereby forming beams for delivering wireless downlink signals to the spatially-distributed user terminals.

Another illustrative embodiment of a disclosed wireless network communications method includes: exchanging wireless uplink and downlink signals with spatially-distributed user terminals; deriving, for each combination of user terminal antenna and base station antenna, an estimated uplink channel response coefficient from the wireless uplink signals; determining a steering transform based at least in part on the estimated uplink channel response coefficients; applying the steering transform to spatially-distinct downlink signals to produce antenna-specific downlink signals for each antenna of a multi-antenna base station, thereby forming beams for delivering wireless downlink signals to the spatially-distributed user terminals; finding a mobility indictor for each user terminal based at least in part on the estimated channel response coefficients; and scheduling, based on the mobility indicators, at least one action in a set consisting of: re-deriving the estimated uplink channel response coefficients, and re-determining the steering transform.

Each of the foregoing embodiments may be implemented individually or in combination, and may be implemented with any one or more of the following features in any suitable combination: (1) the controller compares the estimated uplink channel response coefficients to values used for determining the steering transform, and re-determines the steering transform upon detecting a sufficient difference. (2) the estimated uplink channel response coefficients are determined on a per user terminal antenna basis for each antenna in said array. (3) the controller monitors, for each user terminal antenna, an elapsed time since that user terminal antenna's estimated uplink channel coefficients were derived. (4) upon determining that the elapsed time exceeds a threshold, the controller refreshes the estimated uplink channel response coefficient for that user terminal antenna by initiating a wireless packet exchange with that user terminal antenna. (5) upon determining that the elapsed time exceeds a threshold, the controller designates that user terminal antenna as inactive and re-determines the steering transform for active user terminal antennas. (6) the controller derives, from the estimated channel response coefficients, a mobility indicator for each user terminal antenna, and wherein the threshold depends on the mobility indicator for that user terminal antenna. (7) each of the multiple transmit chains and multiple receive chains provide OFDM modulation and demodulation, respectively. (8) the estimated uplink channel response coefficients are derived as a function of base station antenna, user terminal antenna, and frequency bin. (9) the receive chain derives estimated uplink channel response coefficients based on pilot signals in the wireless uplink signals. (10) the controller schedules the pilot signals based on the mobility indicator. (11) the controller schedules the pilot signals for subsampling with respect to the frequency bins. (12) the controller sets a degree of subsampling that may be based on the mobility indicator, frequency and time coherence of the CSI, and/or the selected beamformer. (13) the mobility indicator represents a difference, relative to a baseline value, of a normalized dot product of current and past estimated uplink channel response coefficients for a given user terminal antenna. (14) the baseline value is a sliding window average of previous normalized dot products. (15) each of the normalized dot products, including the previous normalized dot products, correlate estimated uplink channel response coefficients separated by a fixed time delay. (16) the normalized dot product is a ratio between a dot product averaged over frequency bins and a magnitude product averaged over the frequency bins. (17) the normalized dot product is an average ratio between a dot product and a magnitude product, the ratio being averaged over frequency bins. (18) the controller groups user terminals based at least in part on the mobility indicators. (19) as part of determining the steering transform, the controller determines a steering transform for each user terminal group. (20) at least some of the spatially-distributed user terminals provide said uplink and accept said downlink signals in compliance with IEEE Std 802.11 (2012). (21) the deriving operation yields estimated uplink channel response coefficients on a per user terminal antenna basis for each base station antenna. (22) the method further comprises: monitoring, for each user terminal antenna, an elapsed time since that user terminal antenna's estimated uplink channel coefficients were derived; and upon determining that the elapsed time exceeds a threshold, performing at least one action in a set consisting of: designating that user terminal antenna as inactive; initiating a packet exchange with that user terminal antenna to refresh the estimated uplink channel response coefficient; and re-determining the steering transform for active user terminal antennas. (23) the method further comprises: comparing the estimated uplink channel response coefficients to values used for determining the steering transform; and upon detecting a sufficient difference, re-determining the steering transform. (24) the method further comprises: deriving, from the estimated channel response coefficients, a mobility indicator for each user terminal antenna, and setting the threshold based at least in part on the mobility indicator for that user terminal antenna.

BRIEF DESCRIPTION OF THE DRAWINGS

Refer now to the drawings wherein depicted elements are not necessarily shown to scale, but like or similar elements may be designated by the same reference numerals through the several figures. In the drawings.

Figure 1:
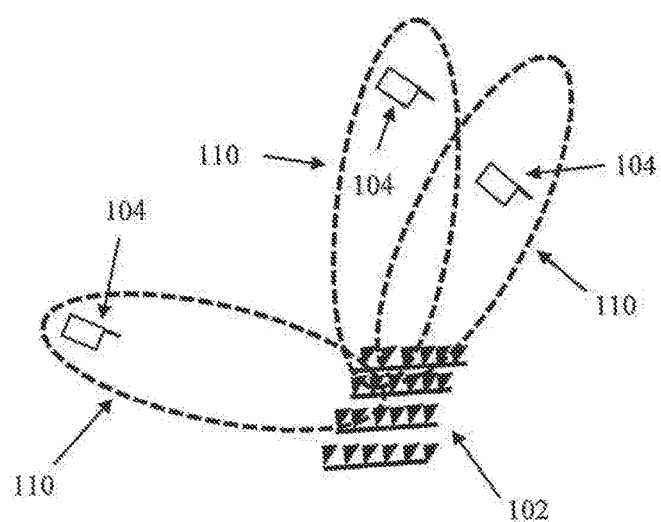
FIG. 1 is a spatial beamforming diagram of an illustrative MU-MIMO wireless system.

It should be understood, however, that the specific embodiments given in the drawings and detailed description do not limit the disclosure. On the contrary, they provide the foundation for one of ordinary skill to discern the alternative forms, equivalents, and modifications that are encompassed by the scope of the appended claims.

Terminology

Most of the terms used herein will be recognizable to those of ordinary skill in the art, and accordingly it should be understood that when not explicitly defined, terms should be interpreted as having the meaning presently accepted by those of ordinary skill in the art.

The acronym CSI stands for channel state information, which may be expressed as a set of complex coefficients each representing the attenuation and phase delay for a given frequency of a signal traversing a communications link.

The acronym EVM stands for error vector magnitude. The acronym FFT stands for Fast Fourier Transform. The acronym LNA stand for low noise amplifier. The acronym MIMO stands for multi-input multi-output, and in the wireless communications context, it applies to systems performing wireless communications between nodes, at least one of which employs multiple antennas. The acronym MU-MIMO stands for multi-user, multi-input, multi-output, and in the context of the present application, applies to a MIMO system having more than just two nodes.

The acronym OFDM stands for orthogonal frequency division multiplexing, a modulation technique commonly implemented using an inverse Fourier Transform to distribute data symbols onto tightly spaced subcarrier frequencies. At the receiving end, the data symbols can be recovered via a regular Fourier Transform. A closely related modulation technique is single-carrier frequency division multiple access (SC-FDMA), which is sometimes referred to as linearly precoded orthogonal frequency division multiple access.

The term "pilot" or "pilot signal" as used herein refers to a signal having a predetermined pattern or content suitable for a receiving device to measure properties of the wireless channel, i.e., CSI. Training patterns, such as the short training sequence (STS) and long training sequence (LTS) defined for IEEE Std 802.11, timing synchronization patterns, and even frame markers, can serve as pilot signals. Packet headers and frame preambles typically include one or more such patterns, but it is generally desirable for pilot signals from different user terminals to be orthogonal to each other, whether through time-division multiplexing, frequency-division multiplexing, code-division multiplexing, spatial diversity, or some other mechanism that minimizes interference so as to enable fast but accurate CSI measurement.

"PHY" is an abbreviation for "physical layer", a term used in the 802.11 standards.

In this application, the use of the singular includes the plural, such that the articles "a" and "an" mean "at least one", and the use of the conjunction "or" has the inclusive meaning "and/or" unless specifically stated otherwise. Unless otherwise specified, the term "including" (as well as its other forms, such as "includes" and "included") is open-ended and not intended to be limited to any specifically identified items. Unless otherwise stated, terms such as "element" or "component" encompass not just unitary modules, but also multi-module assemblies or submodules providing the same characteristics.

DETAILED DESCRIPTION

FIG. 1 shows an illustrative array of multiple antennas 102 that may be associated with a base station of a wireless communications network. The wireless communications network may be a cellular network (such as LTE), a wireless local area network (such as those provided by the set of IEEE 802.11 standards), a wireless personal area network (such as those provided by the set of IEEE 802.15 standards), or indeed any wireless communications network supporting bi-directional communications between multiple devices. FIG. 1 further shows spatially-distributed user terminals 104, which in this example take the form of smart phones. The base station employs the array of antennas to provide steerable beamforming in the base station's effective broadcast/sensitivity patterns, preferably providing a separate beam 110 for each user terminal. In addition to extending the base station's range for a given power rating, beamforming enhances spatial diversity in a fashion that drastically increases the system's spectral efficiency.

Figure 2:
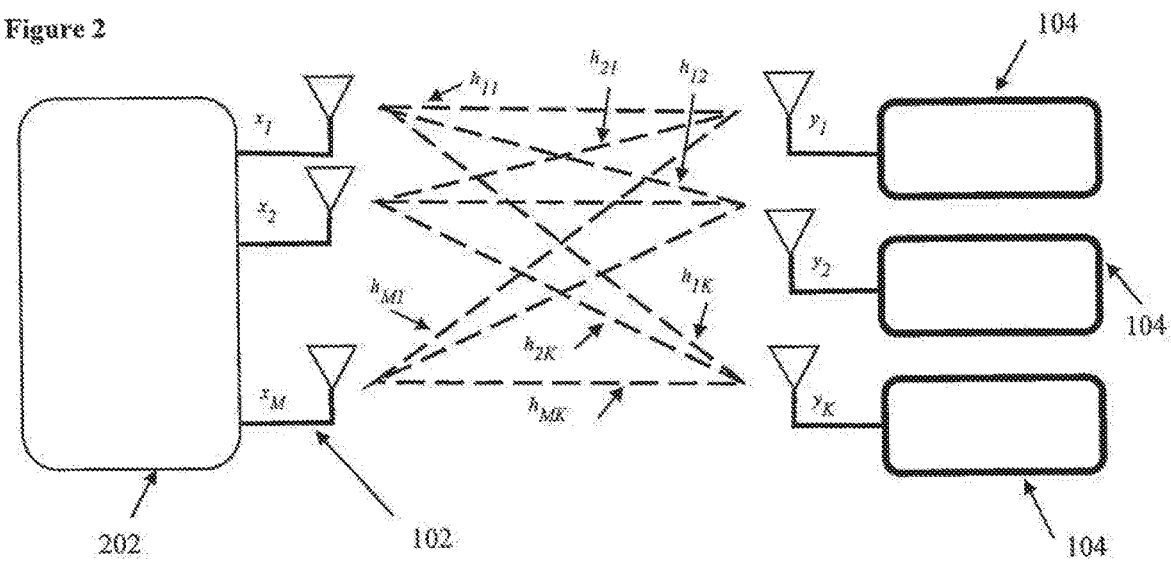
FIG. 2 is an illustrative MU-MIMO wireless link diagram showing CSI coefficients.

To assure proper beamforming, the base station collects channel state information (CSI) for each active user terminal. FIG. 2 shows a set of user terminals 104 providing uplink signals Y1, Y2, . . . YK in a time multiplexed, frequency multiplexed, spatially multiplexed, or some other orthogonal fashion, to the array of antennas 102 for base station 202. The antenna signals X1, X2, . . . XM are related to the uplink signals via the channel response. At any given frequency bin i, the channel response for an uplink signal from user terminal antenna k to base station antenna m can be represented as a complex coefficient $H\_up[m,k,i]$ that specifies the signal's attenuation and phase delay. As provided in section 3.3 of C. Shepard et al., "Argos: Practical Many-Antenna Base Station", MobiCom'12, Istanbul, Turkey, Aug. 22-26, 2012 (available at argos.rice.edu/pubs/Shepard-MobiCom12.pdf), a calibration coefficient matrix, $C[m,i]$ is first determined by having the base station's antennas transmit to each other to determine their relative offsets. Each estimated narrowband uplink channel coefficient $H\_up[m,k,i]$ may be normalized to a reference antenna on the base station antenna array to remove any constant timing or phase offset across the array, then the normalized coefficients are combined with the calibration coefficients to estimate the downlink channel coefficients $H\_dn[m,k,i]$. Then, in accordance with section 2.2 of Shepard, a steering transform is derived from the downlink channel coefficients. The steering transform may take the form of a K×M complex-valued weight matrix that, when applied to the K downlink signals for the active user terminals, yields the M antenna-specific downlink signals. (When multiple frequency bins are employed, the weight matrix varies for each frequency bin.) The steering transform may be determined using the conjugate method, the zero-forcing method, minimum mean square error (MMSE), or any other of the suitable methods described in the open literature.

The Zero-forcing Beamforming (ZFBF) method drives interference between spatial streams to zero, and while it approaches optimal performance for many situations, it can be inefficient when users' CSI is not sufficiently orthogonal (see, e.g., T. Yoo and A. Goldsmith, "On the optimality of multiantenna broadcast scheduling using zero-forcing beamforming", IEEE Journal on Selected Areas in Communications, vol. 24, March 2006, and E. Aryafar, N. Anand, T. Salonidis, and E. W. Knightly, "Design and Experimental Evaluation of Multi-user Beamforming in Wireless LANs", in Proc. ACM MobiCom, Chicago, Ill., September 2010). ZFBF involves the calculation of the H matrix's pseudo-inverse:

$$W=(H_H H)^{-1} H^H$$

Where superscript H represents the matrix conjugate transpose. When the transmitter precodes with perfect ZFBF weights W, signals ideally cancel the effects of the wireless channel at the receiver, enabling each user to receive their own, independent streams. On the other hand, conjugate (also called maximum ratio transmission) combining, which simply uses the conjugate of the channel matrix as the weights, that is $W=H^H$, does not cancel interference between the users but may nevertheless be appropriate for use in massive MIMO systems where the beams become narrower and stronger, causing the inter-user interference to become relatively low. (Zero-forcing generally outperforms conjugate, but for a large number of users becomes far more burdensome if not outright impractical to compute.) These and other related MU-MIMO wireless channel coding techniques enable a base station equipped with multiple antennas to transmit simultaneous data streams to separate user terminals, leveraging spatial diversity to scale data rates with the number of antennas in the base station array.

In addition to enabling spatial diversity, CSI is also useful for user grouping (e.g., as provided in J. Mao, J. Gao, Y. Liu, and G. Xie, "Simplified semi-orthogonal user selection for MU-MIMO systems with ZFBF", Wireless Communications Letters, IEEE, vol. 1, no. 1, pp. 42-45, 2012), and inter-cell interference mitigation (e.g., as provided in M. Rahman and H. Yanikomeroglu. "Enhancing cell-edge performance: a downlink dynamic interference avoidance scheme with inter-cell coordination", Wireless Communications, IEEE Transactions on, vol. 9, no. 4, pp. 1414-1425, 2010).

The measurement process for estimating the narrowband uplink channel coefficients H_up[m,k,i] is commonly called "channel sounding", and it may be accomplished in a number of ways. For example, IEEE 802.11af is a standard amendment for Wi-Fi to operate in unused UHF Television-band White Space (VWS) channels (e.g., as described in A. B. Flores, R. E. Guerra, E. W. Knightly, P. Ecclesine, and S. Pandey, "IEEE 802.11af: a standard for TV white space spectrum sharing," IEEE Communications Magazine, vol. 51, no. 10, pp. 92-100, 2013). With the amendment, the standard can also employ MU-MIMO features of IEEE 802.11ac (e.g., as provided in IEEE Std 802.11ac-2013, "Amendment 4: Enhancements for very high throughput for operation in bands below 6 GHz", 2013). There, downlink CSI is explicitly obtained by the base station transmitting a sounding packet from each antenna in the array to each of the user terminals, enabling the user terminals to measure the downlink channel coefficients and transmit the measurements in a control frame to the base station (e.g., as provided in IEEE Std 802.11af-2013, "Amendment 5: Television white spaces (tvws) operation", 2013). Unfortunately, the overhead required by this sounding method increases proportionally with the number of base station antennas (M) and the aggregate number of user terminal antennas (K) such that this overhead can severely decrease the achievable throughput gains (see, e.g. X. Xie, X. Zhang, and K. Sundaresan, "Adaptive feedback compression for MIMO networks", in Proc. ACM MobiCom, pp. 477-488, 2013, and O. Bejarano, E. Magistretti, O. Gurewitz, and E. Knightly, "MUTE: Sounding Inhibition for MU-MIMO WLANs." Proc. ACM SECON, 2014).

Here we propose elimination of explicit channel sounding altogether, instead relying inasmuch as possible on purely opportunistic channel sounding in which CSI is implicitly estimated from each received uplink transmission, whether a data or control frame. Since each uplink frame already contains a packet header with a training sequence in its preamble (e.g., the TVHTLTF in 802.11af), we use every uplink reception from a user terminal to the base station including, e.g., data frames, ACKs, and management frames in order for the base station to estimate downlink CSI. This approach exploits a useful property of UHF bands: they can be highly stable on the order of 100 ms while maintaining high multi-user diversity (see, e.g., N. Anand, R. E. Guerra, and E. W. Knightly, "The Case for UHF-band MU-MIMO", in Proc. ACM Intl. Conf. on Mobile Computing and Networking (MobiCom), Maui, Hi., September 2014). This opportunistic approach eliminates CSI sounding overhead if the channel remains sufficiently unchanged between uplink transmissions.

And, given that the UHF channels for 802.11af networks can remain stable for relatively long periods of time, we target to avoid explicit channel sounding altogether and rely on standard PLCP preambles [5] in overheard uplink transmissions to estimate the downlink channel since that estimate will remain valid over multiple packet timescales.

The key strategy for implicit "opportunistic (implicit) channel sounding" is as follows: when historical implicit CSI is available and "fresh," the AP forms user groups and calculates precoding weights for the optimal multi-user transmission group determined by a MAC (Medium Access Control) scheduler. Conversely, inventors utilize two methods when implicit CSI is unavailable or "stale" for a particular STA: 1) a single downlink frame for the stale STA is de-queued and transmitted by the AP using MISO omni-directional transmission; the subsequent ACK will then provide an update of implicit CSI for that STA; or 2) alternately, the AP could fall back to legacy (historical) implicit sounding methods, if no traffic is available.

In order to determine the feasibility of such an opportunistic sounding policy in 802.11af systems and explore the throughput gains, inventors measured a series of indoor and outdoor multi-user channel traces and perform protocol analysis to understand policy tradeoffs for opportunistic CSIT.

As a result of said measurements and protocol analysis, opportunistic sounding is found to be beneficial in at least four operating regimes, namely those in which: (i) channel conditions are sufficiently stable such that beamforming error due to obtaining CSI from a prior uplink transmission is negligible; (ii) legacy 802.11 user terminals cannot respond to beamforming requests and otherwise could not leverage full spatial diversity; (iii) the number of spatial streams grows such that even implicit channel estimation generates significant overhead; and (iv) the Modulation and Coding Scheme (MCS) is sufficiently high order that any wasted airtime due to channel sounding overhead imposes a high relative cost. Scenario (ii) is of particular interest because it enables new 802.11 base stations with multi-user capabilities to operate in spectral-efficient multi-user modes with legacy 802.11 equipment that does not otherwise support multi-user modes.

To explore the key performance factors of opportunistic sounding, we employed a custom MIMO SDR front-end for the WARPv3 SDR platform (available at, e.g., warpproject.org). This platform enables characterization of multi-user UHF channels via opportunistic sounding even in the presence of user terminal or environmental mobility. The custom SDR hardware implements a modified SDR channel sounding framework originally designed for high-speed mobile implicit multi-user channel measurements (as provided in, e.g., C. Shepard, A. Javed, and L Zhong, "Control Channel Design for Many-Antenna MU-MIMO," in Proc. ACM MobiCom, New York, N.Y., pp. 578-591, 2015). Experimental radio licenses WH2XJV and WJ9XFF were obtained to operate the experimental equipment on UHF channels in Houston, Tex. and to perform a series of indoor and outdoor measurement campaigns in various mobility scenarios to analyze MU-MIMO beamforming capacity with respect to CSI overhead.

We find that fixed wireless nodes utilizing UHF spectrum exhibit long-term stable CSI under environmental and static mobility scenarios. (The 2.4 GHz and 5 GHz spectra have also been found to show similar stabilities.) Consequently, we find that, with a low number of spatial streams, performance of both active and opportunistic implicit sounding policies significantly exceeds that of the current 802.11af protocol due to the reduced overhead of collecting CSI, even when taking into account the measured beamforming inefficiency of using delayed CSI. We further extend our analysis to show that opportunistic implicit sounding with more spatial streams yields increasing benefits, enabling future systems with many more antennas than the current maximum of eight in commodity base stations.

Unlike explicit channel sounding, implicit channel sounding relies on the assumption that the physical channel between the transmitter and receiver is reciprocal in nature so that estimating CSI in the downlink is equivalent to estimating CSI in the uplink direction and vice versa. Accurate array reciprocity calculation is described in C. Shepard, H. Yu, N. Anand, E. Li, T. Marzetta, R. Yang, and L. Zhong "Argos: Practical many-antenna base stations", in Proc. ACM MobiCom, Istanbul, Turkey, August 2012, and an experimental demonstration of mutual information between downlink and uplink channel estimates is provided by M. Guilaud and F. Kaltenberger "Towards practical channel reciprocity exploitation: Relative calibration in the presence of frequency offset", in Proc. IEEE WCNC, pp. 2525-2530, 2013. Therefore, we assume that uplink channel estimation is sufficient to estimate the downlink channel for our purposes, and we propose that all new base stations should have the capability to perform reciprocity calibration and provide implicit channel estimation.

Figure 3A:
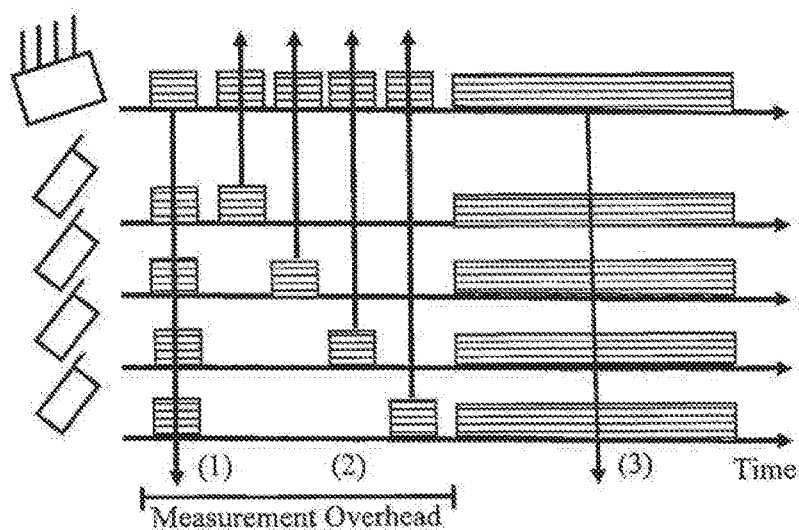
FIG. 3A is a link-time graph showing implicit CSI measurement overhead.

FIG. 3A is a link-time graph showing implicit CSI measurement overhead. The overhead includes (1) the base station broadcasting a control frame to the user terminals, scheduling (2) staggered Null Data Packets (NDPs) uplink signals from each user terminal. As the contents of the NDPs are predetermined, the base station can correlate the uplink signals with an NDP to derive the uplink CSI coefficients, from which the downlink CSI coefficients can be determined and used for determining the steering transform. Implicit CSI measurement provides a reduction in overhead relative to explicit channel sounding, which requires the CSI coefficients for each base station antenna to be measured and communicated from each of the user terminals to the base station, and necessitates additional polling and channel reservation overhead as provided by IEEE Std 802.11af-2013. Explicit sounding overhead scales as O(MK), while implicit sounding overhead scales as O(K) because the M base station antennas are sounded in parallel.

The benefits of implicit channel sounding vary based on node/environment mobility as well as the protocol and radio configuration utilized. For example, if the wireless channel varies rapidly due to high mobility, frequent channel sounding, whether implicit or explicit, will be required to obtain accurate CSI. Per-packet channel sounding mechanisms that incur protocol overhead, such as the multi-user implicit sounding mechanisms (e.g., the mechanism analyzed in H. Lou, M. Ghosh, P. Xia, and R. Olesen, "A comparison of implicit and explicit channel feedback methods for MU-MIMO WLAN systems", IEEE PIMRC, pp. 419-424, 2013) may be required to ensure that channel estimates remain accurate in such environments.

However, in the case where the wireless channel remains coherent for long periods of time, for example, due to limited or lack of mobility, then it becomes possible to rely on previously collected CSI for current MU-MIMO transmissions. Practically, such environments do exist in wireless networks utilizing sub-GHz carrier frequencies, for instance TVWS networks, as well as certain fixed Wi-Fi networks. (In the absence of node mobility, similar channel stability has also been observed in the 2.4 GHz and 5 GHz bands.) In such environments, the CSI overhead may unnecessarily reduce data throughput, and accordingly an opportunistic strategy is proposed herein.

Figure 3B:
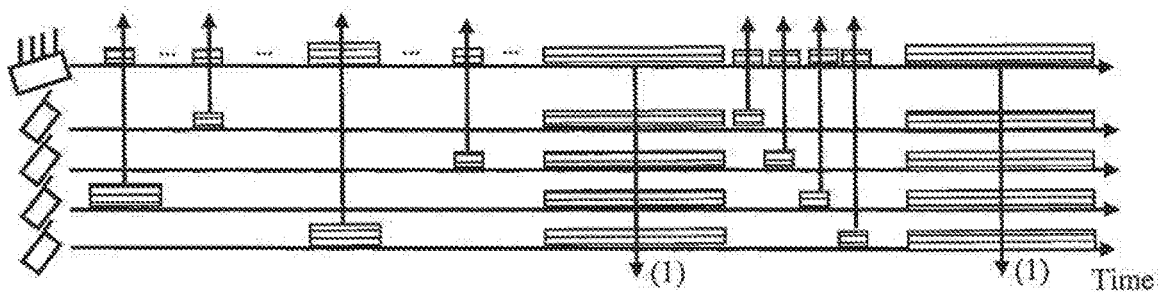
FIG. 3B is a link-time graph showing opportunistic CSI measurement.

FIG. 3B is a link-time graph showing an opportunistic implicit CSI measurement that avoids channel sounding overhead altogether. During normal communications activity, the various user terminals transmit packets (including data and control frames) to the base station. The packet headers and frame markers each include known patterns for equalizer training and/or timing synchronization. The base station derives CSI estimates by correlating the relevant portions of the received signals with the known patterns, and maintains the most recent CSI estimates for each combination of m, k, and i (i.e., as a function of base station antenna, user terminal antenna, and frequency bin) in memory. The age (i.e., the elapsed time since the estimate was obtained) is also tracked. So long as the age of all the estimated CSI is less than the coherency time for the channel, it can be used as needed forgrouping users, determining steering transforms, mitigating inter-cell interference, etc., without incurring any overhead at all. Thus, in FIG. 3B, when the base station has downlink data to be sent to the various user terminals, the steering transform may be calculated and used contemporaneously at (1). The various acknowledgement (ACK) packet responses from the user terminals offer another opportunity for the uplink CSI coefficients to be measured and used to update the memory for use with subsequent downlink communications.

Should the age of CSI estimates for any user terminal be determined to be too large (i.e., the estimated CSI is no longer "fresh"), the base station may initiate a targeted communication to that user terminal to trigger an ACK response or to schedule a periodic NDP, either of which can be used to update the CSI estimate for that user terminal. If too much time passes without substantive data communications between the base station and user terminal, the base station may designate the user terminal as inactive and remove it from the steering transform. Such a retirement policy may ensure that the overhead for forced CSI refreshes is kept low, such that the overhead for opportunistic implicit CSI scales as O(1), remaining largely independent of the number of base station antennas and user terminal antennas.

Given that the UHF channels for 802.11af networks can remain stable for relatively long periods of time, we target to avoid channel sounding altogether and rely on standard physical layer convergence procedure (PLCP) preambles (the packet headers for PLCP protocol data units, or PPDUs) in received uplink transmissions to estimate the downlink channel since that estimate will remain valid over multiple packet timescales.

In summary, when historical implicit CSI is available and "fresh", the base station forms user groups and calculates precoding weights for each of the optimal multi-user transmission groups determined by the MAC scheduler. When implicit CSI is unavailable or "stale" for a particular user terminal, either of two methods may be employed [.]: 1) a single downlink frame for the stale user terminal may be de-queued and transmitted by the base station using MISO omnidirectional transmission; the subsequent ACK response will then enable an update of implicit CSI for that user terminal. 2) alternatively, the base station could fall back to legacy implicit sounding methods if no traffic is available.

In order to determine the feasibility of such an opportunistic sounding policy in 802.11af systems, we measured a series of indoor and outdoor multi-user channel traces and performed protocol analysis to understand policy tradeoffs for opportunistic CSI. The measurements were performed using a base station design similar to that shown in FIG. 4. A host system bus 402 couples a system bridge 406 (and via the system bridge, one or more processor cores 404 and system memory 405) to an information storage module 408, a peripheral controller 410, a wired network interface card 412, and a central controller 414 of a wireless network interface unit 416. Bus 402, cores 404, memory 405, bridge 406, storage module 408, peripheral controller 410, and network interface card 412 are common components of commercially available computers of many kinds including server computers, embedded computer systems, and desktop computers.

Information storage module 408 provides nonvolatile storage of data and software and may take the form of flash memory, a solid state disk, an optical disk, magnetic media, or other computer-readable media. When the system boots, the processor core(s) 404 access the storage module 408 to retrieve software instructions and store them in system memory 405 and/or cache for fast access. The software may include hardware drivers, operating system layers that facilitate the use of the hardware while also providing standardized interfaces for applications such as, e.g., software that configures and controls the wireless network interface unit 416 to implement the functions of a wireless network base station. Among such functions may be the conveyance of transmit and receive data streams between a wired network (via network interface card 412) and the wireless network.

In at least some embodiments, the central controller 414 of the wireless network interface unit 416 take the form of a general purpose processor or programmable digital signal processor programmed (e.g., via firmware) to implement the media access control (MAC) functionality of the IEEE Std. 802.11, including prioritization and ordering of data frames. The central controller sends K concurrent downlink data streams for the active user terminals and receives K concurrent uplink data streams.

Figure 4:
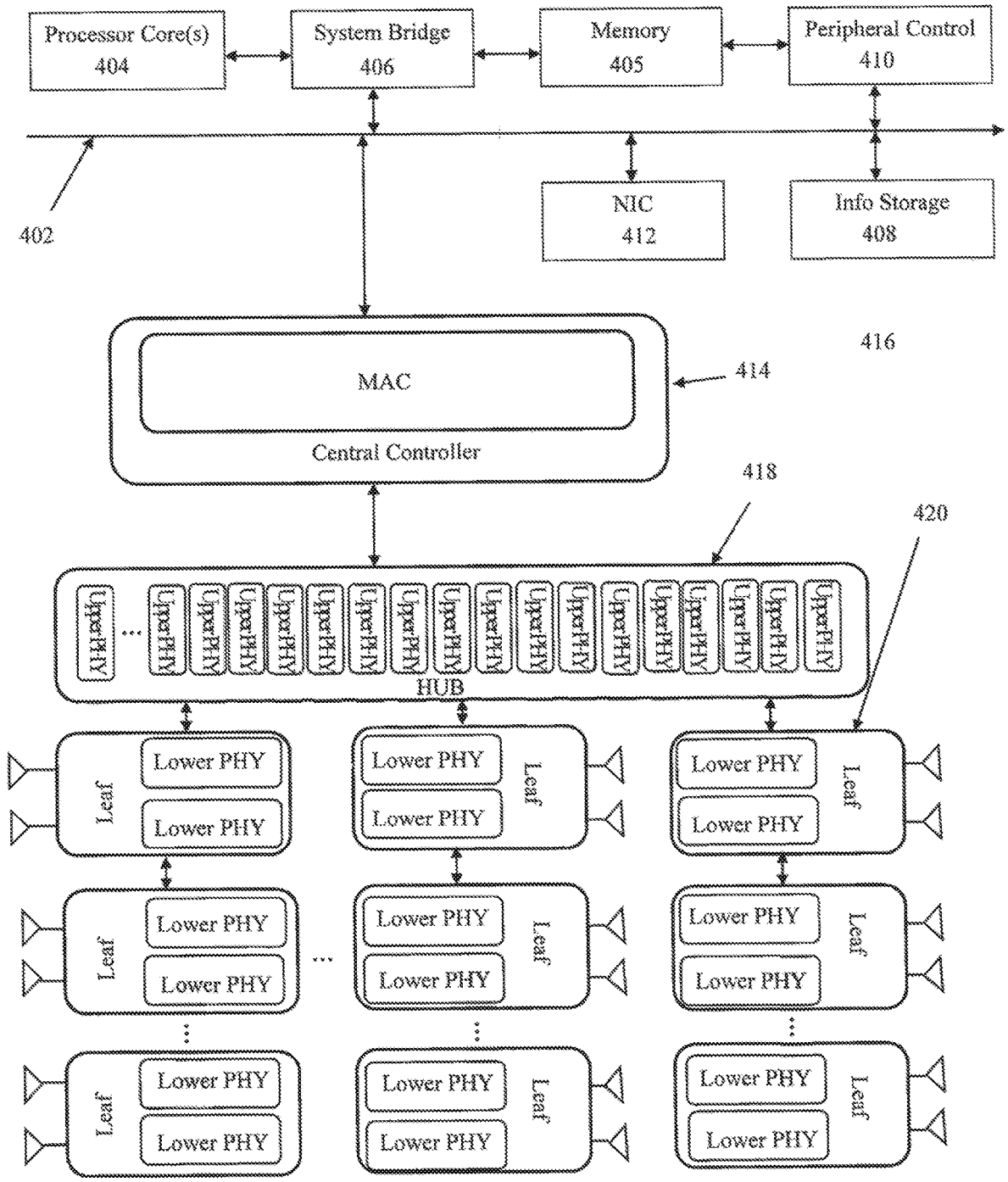
FIG. 4 is a block diagram of an illustrative base station architecture.

A hub 418 processes and distributes the K downlink data streams to each of M/2 leaf nodes 420, each leaf node including transceivers for two independent antennas 102. (The use of two antennas per leaf node is merely illustrative and not limiting on the scope of this disclosure. Implementations with fewer or more antennas per leaf node, including heterogeneous combinations, are contemplated.) The hub 418 further aggregates digital receive signals from each of the leaf nodes 420 to form K uplink signals which are equalized and decoded to extract K uplink data streams for the central controller 414. The uplink and downlink processing implemented by the hub 418 is shown in FIG. 4 as a set of K "Upper PHY" modules. In at least some embodiments, the hub 418 takes the form of a field programmable gate array (FPGA), though of course an application specific integrated circuit (ASIC) or sufficiently parallel programmable processor can alternatively be employed.

Each of the leaf nodes 420 receives K concurrent downlink data streams and applies the steering transform weights to derive antenna-specific signals, which are delivered via transceivers to the appropriate antennas. From each antenna transceiver, the leaf nodes 420 receives one antenna-specific uplink signals, which is processed and weighted by the appropriate steering transform weights to determine antenna-specific contributions to each of the K uplink signals. The illustrated leaf nodes 420 include transceivers for two independent antennas, and are optionally configured in a tree or daisy-chain arrangement. As the antenna-specific contributions are determined, the contributions for the local antennas are added together and added to any accumulated contributions received from leaf nodes in the direction distal from the hub 418 before passing the sums or averages onward toward the hub. This add-and-pass approach keeps the number of digital receive signals handled by connections between the leaf nodes constant at K. The hub may perform the final addition to obtain the fully-accumulated K uplink signals.

Figure 5:
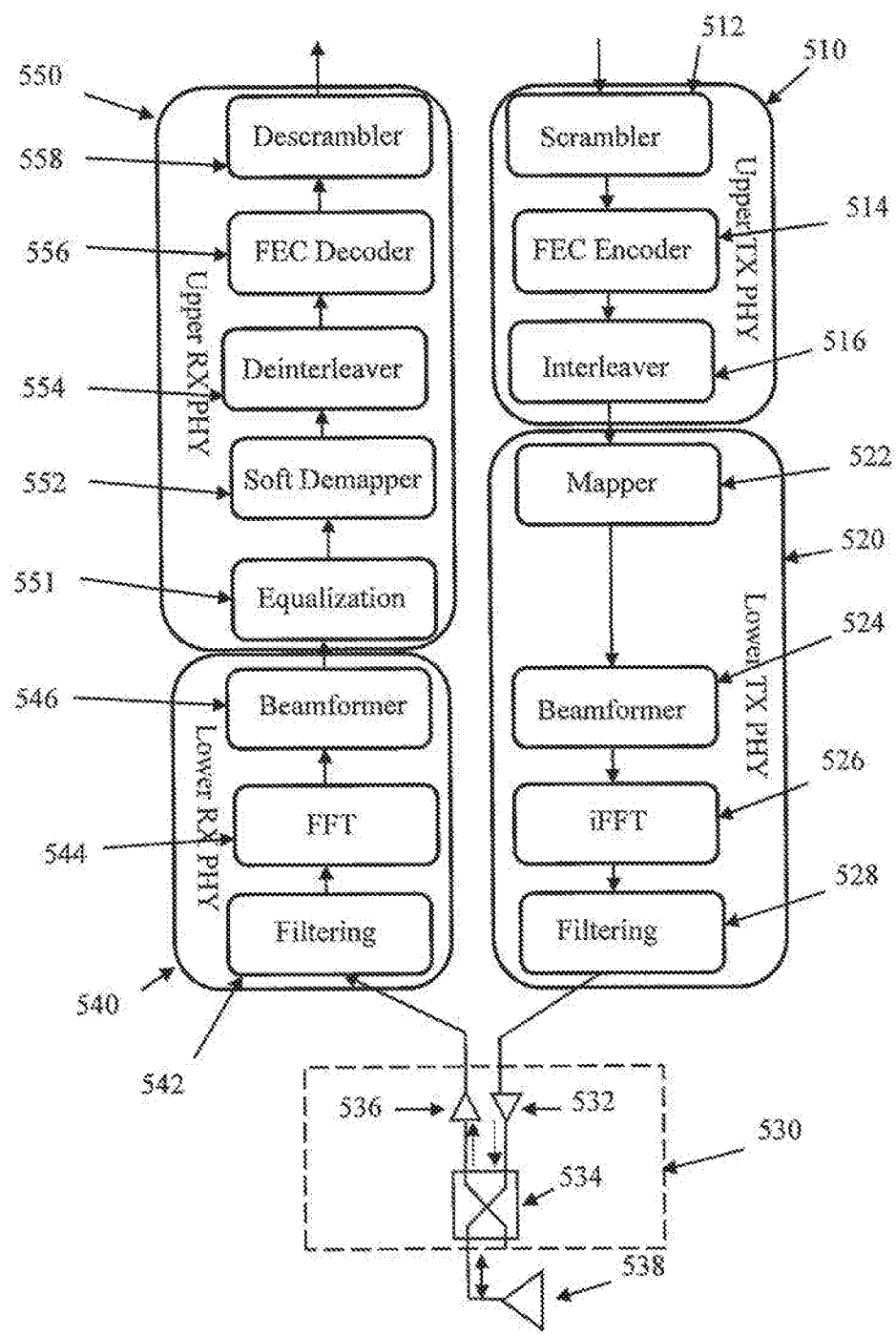
FIG. 5 is a block diagram of illustrative transmit/receive chains coupled to an illustrative transceiver.

The uplink and downlink processing implemented by the leaf nodes 420 is shown in FIG. 4 as a set of M "Lower PHY" modules (two per leaf node). FIG. 5 illustrates how illustrative Upper PHY modules and Lower PHY modules may cooperate to provide transmit and receive chains for each transceiver and antenna.

For each of the K downlink data streams, an illustrative Upper PHY transmit module 510 implements a scrambler 512, a forward-error-correction (FEC) encoder 514, and an interleaver 516. By exclusive-OR'ing the data stream with a binary mask, the scrambler 512 randomizes the bit patterns in the data stream, which typically improves performance of the FEC and equalization schemes. The FEC encoder 514 adds redundancy to the downlink data stream, typically by periodically inserting so-called "parity symbols", which together with the data portion of the codewords enable detection errors to be identified and/or corrected. The interleaver 516 then reorders the codeword symbols in a strategic fashion that provides increased separation between formerly adjacent symbols. (When this operation is reversed in the receive chain, any concentrated error bursts tend to get converted into isolated symbol errors, which are better tolerated by most FEC decoders.) The downlink data stream output by the interleaver 516 is only one of the K data streams provided from the K Upper PHY transmit modules 510 to the M Lower PHY modules 520.

Each of the M illustrative Lower PHY transmit module 520 accepts the K downlink data streams and implements a mapper 522, a beamformer 524, an inverse Fast Fourier Transform (iFFT) module 526, and a pre-equalization filter 528. The mapper 522 maps corresponding bits from the K downlink data streams to K sets of frequency bin coefficients. The number of bits mapped to each frequency bin may be optimized based on the spectra of the channel response and noise. Beamformer 524 applies the steering transform weights for the associated antenna to the frequency bin coefficients to obtain one antenna-specific set of frequency coefficients. The iFFT module 526 converts the set of frequency coefficients into a time-domain set of downlink signal samples. Pre-equalization filter 528 filters the downlink signal samples to at least partially pre-compensate for the channel response, enabling the received signal to exhibit reduced inter-sample interference. The downlink signal output by the filter 528 is converted from digital to analog (and optionally cleaned up with analog filters), to become only one of M downlink signals provided from the M Lower PHY transmit modules 520 to the M transceivers 530.

Each of the M illustrative transceivers 530 accepts a downlink signal with a driver 532, which supplies sufficient power to impose the downlink signal on an antenna 538. The driver 532 is coupled to the antenna 538 by a directional coupler 534 or hybrid, which isolates the downlink signal from any uplink signal being received via the antenna 538. A low noise amplifier (LNA) 536 amplifies the antenna-specific uplink signal and supplies the amplified uplink signal for analog-to-digital conversion (optionally employing pre-conversion analog filters to enhance the signal to noise ratio) and provision of antenna-specific uplink signal samples to a Lower PHY receive module 540.

Each of the M illustrative Lower PHY receive modules 540 accepts one of the M antenna-specific uplink signals and implements a filter 542, a Fast Fourier Transform (FFT) module 544, and a beamformer 546. The filter 542 may operate to shorten the channel response. FFT module 544 converts the sampled uplink signal into a set of antenna-specific frequency coefficients. Beamformer 546 applies the steering transform weights to the antenna-specific frequency coefficients to produce K sets of uplink signal frequency coefficients. The K sets of coefficients output by the Lower PHY receive module 540 are but one of the sets output by the M Lower Phy receive modules and accumulated as the accumulated uplink coefficient sets are delivered to the hub In the hub, each of K illustrative Upper PHY receive modules 550 receives one of the sets of accumulated frequency coefficients, and implements an equalizer 551, a demapper 552, a deinterleaver 554, an FEC decoder 556, and a descrambler 558. Equalizer 551 performs a spectrum adjustment on the set of accumulated frequency coefficients. Demapper 552 extracts bits from the frequency coefficients, reconstructing the uplink data stream. Demapper 552 may be a "soft" demapper that preserves one or more extra bits of resolution in the symbols of the reconstructed data stream to assist the FEC decoding process. Deinterleaver 554 reverses the operation of interleaver 516, thereby dispersing any error bursts. FEC decoder 556 operates on the uplink data stream, using the redundancy added during the encoding process to detect and correct symbol errors. Descrambler 558 reverses the operation of scrambler 512, thereby delivering a reconstructed version of the uplink data stream.

Filters 528 and 542 may be adaptive, or may be set based on uplink and downlink channel response estimates derived from analysis of known data patterns such as, e.g., training sequences, frame markers, or other predetermined fields in packet headers. Such channel response estimation may be performed by the Lower PHY receive modules 540, either alone or in cooperation with the central controller 414.

To predict system performance in a MU-MIMO environment having multiple mobile user terminals, we performed measurements using the control channel techniques described in PCT/US16/29077, "Control Channel Design for Many-Antenna MU-MIMO Systems", as adapted for use on the above-described hardware platform. We concentrated on the effects of the time interval between when a channel is sounded and when the final beamformed transmission takes place. We call this time the "Sounding-Transmission Interval," or S-T interval. As the S-T interval increases, differences develop between the sounded CSI and the actual channel response at the time the zero-forcing steering transform is employed, resulting in inter-stream interference between user terminals as well as reduction in their desired signal strength. In mobile environments, it is highly likely that a larger S-T interval will yield higher interstream interference due to increased CSI error and therefore lower Signal-to-Interference-and-Noise Ratio (SINR). Thus, the S-T interval is important for understanding the performance of opportunistic implicit sounding since an opportunistic base station may have cached, or "stale" CSI obtained from previous uplink transmissions made at different times. In order to use this CSI, the base station should make a decision about future beamformed transmissions utilizing that stale CSI.

On the other hand, an implicit or explicit base station refreshes all CSI simultaneously at the beginning of a multi-user packet, yielding an S-T interval of nearly zero. Depending on the length of the S-T interval, an opportunistic system could exhibit high inefficiency due to unnecessary sounding overhead, or poor performance due to stale CSI. In order to emulate opportunistic collection of CSI, we characterize how drift in the CSI of a single user terminal will affect the performance of a future beamformed transmission including multiple other user terminals. We begin by modelling the multi-user achievable rate as a function of increasing S-T interval. Our evaluation methodology relies on the assumption of channel reciprocity. We first recorded a series of uplink channel traces of an 8×4 MU-MIMO system with 4 single-radio user terminals using the Argos-WURC system described in N. Anand, R. E. Guerra, and E. W. Knightly, "The Case for UHF band MU-MIMO", Proc. ACM Conf. on Mobile Computing and Networking, Maui, 2014. This system is used to record multi-user CSI over the course of a minute at regular sampling intervals of 2.5 or 5 ms. We then assume that the variation in our channel traces is only caused by changes in the physical MIMO channel rather than the radio hardware and use the empirical capacity of the uplink channel in place of the downlink. As we've previously shown, when accurate reciprocity calibration is performed and interference is identical, the channel capacity in one direction is the same as the other direction.

Each of six different trials was performed either in a: indoor office building environment with non-line-of-sight propagation less than 50 m distance through a wall and a hallway; or (ii) an outdoor heavily forested environment with non-line-or-sight propagation up to 200 m directly through multiple trees and underbrush. The tested environments were static (with no intentional mobility but with environmental motion such as pedestrians walking around the fixed user terminals), and mobile (with one or two user terminals being physically carried by a pedestrian).

Let $P_{jk}$ represent the signal power of spatial stream j received at user terminal k:. If we let $w_{km} \in W$ be the steering transform weight coefficients from base station antenna m to user terminal k, and $h_{mk} \in H$ be the corresponding instantaneous MIMO channel coefficients at the moment of transmission, we can calculate the empirical transmission SINR at user terminal k as the following:

$$SINR_k = \frac{P_{kk}}{N_R + \Sigma_{j,k \neq j} P_{jk}} = \frac{\left|\sum_{m=1}^{M} h_{km} w_{km}\right|^2}{N_k + \Sigma_{j,k \neq j} \left|\sum_{m=1}^{M} h_{km} w_{mj}\right|^2}$$

Using the well-known Shannon-Hartley theorem, we calculate the empirical achievable rate of the beamformed channel as $R_k = \log 2 \ (1 + SINR_k)$.

When user terminals are static, we observe that there is minimal loss of beamforming performance as the S-T interval grows. While we would expect that little to no change in CSI would occur in the largely static environment, an unexpected finding is that environmental mobility, even in the non-line-of-sight environment with pedestrians walking within the same hallway, had no significant effect on the averaged beamformed rate. We observed dips in beamforming performance as pedestrians walked by user terminals, but such disruptions were small, momentary and had little effect on the average rate, returning to high rate after the pedestrian had passed. Even at 1 second S-T intervals, the system resounds rapidly enough that minimal disruption to the user terminals average capacity is observed.

On the other hand, when the user terminal itself becomes mobile, achievable capacity for the mobile user terminal dropped quickly after an S-T interval of approximately 20 ms. This still represents a timescale of tens of packets for a mobile user terminal, indicating that when sufficient uplink traffic is available, an opportunistic sounding base station would provide per-user beamforming performance within 15% of ideal to mobile nodes even with S-T interval on the order of 20 ms. With just environmental mobility, 15% of ideal beamforming performance would be achieved even with a S-T interval on the order of a second.

Our results for the forested environment are similar to the indoor environment as the S-T interval increases; the average supported capacity of the outdoor ZFBF system decreases slowly for the static user terminals and much more rapidly for the mobile user terminals. A noticeable difference is that the S-T interval breakpoint for the outdoor mobile nodes appears at approximately 50 ms while in the indoor tests it was at around 20 ms. This would be consistent with the outdoor environment that, while also non-line-of-sight, has fewer multi-path reflectors and thus exhibits less channel variation as the user terminals move. We find that based on measured beamforming capacity, up to 1 second of S-T interval is allowable to achieve within 15% of ideal per-user beamforming capacity to fixed user terminals, or or 20 ms of S-T interval to achieve within 20% of ideal beamforming capacity with mobile user terminals in an 8×4 zero-forcing system.

We also evaluated the effectiveness of using a fixed S-T interval to achieve a particular performance level. Vendors of fixed wireless 802.11 equipment are increasingly replacing IEEE Std 802.11 DCF MAC with time-division multiple access (TDMA) alternatives for increased long-range efficiency and QoS and could guarantee that opportunistic CSI is available with a given S-T interval. The achievable rate of three user terminals with fixed resounding intervals in an 8×4 zero-forcing system was measured. As expected, a mobile user terminal, which is carried at pedestrian speed within the hallway, demonstrates rapidly changing CSI that cannot be tracked accurately by a large fixed sounding interval. At each re-sounding point, the periodic system matches the oracle capacity, and then rapidly degrades to approximately 20% of optimal. As the mobile user terminal physically moves by a static user terminal, it perturbs its relatively static wireless channel resulting in severe capacity loss. Such an event is difficult to predict and could result in outages or large capacity losses unless identified and corrected. Based on our observations, a fixed S-T interval would either result in either unnecessary sounding or excessive capacity loss due to stale CSI since channels can change mobility states rapidly. Accordingly, we conclude that an opportunistic sounding policy should have an adaptive component that adjusts the maximum tolerable S-T interval based on current channel conditions and the mobility state of the user terminal.

The 802.11af standard employs explicit sounding, and attempts to amortize the overhead by transmitting aggregated data frames. However, the efficiency of this approach depends on the number of frames actually available to aggregate. We analyze the protocol performance of a MU-MIMO system with various channel sounding policies and with varying packet aggregation values in order to emulate both best and worst case scenarios. For this analysis, we set the single frame size to 1500 bytes (the largest regular Ethernet frame size and the best case for CSI overhead amortization) before aggregation. We compare three different channel sounding policies:

Explicit 802.11af. This is the current standard operation of 802.11af MU-MIMO. CSI overhead in this case is caused by the NDP Announcement, the sounding NDP, and the sequence of polls and Compressed Beam Forming Report (CBFR) responses from all 802.11af user terminals before each downlink transmission. The upper and lower bounds on explicit performance are calculated with minimum and maximum feedback compression of the CBFR payload, a highly vendor-specific implementation parameter. We assume no impairment on performance from feedback compression, and plotted the median performance. Although the 802.11af standard only supports up to 8 concurrent spatial streams, we assume that timing and protocol performance scales with the number of streams in order to provide a point of reference for scaling to large numbers of antennas.

Implicit Proposal for 802.11af. In H. Lou (infra), the authors proposed an alternative multi-user CSI sounding protocol that avoids the lengthy CBFR by estimating the channel implicitly with short NDPs. CSI overhead in this case comes from the NDP Announcement and a staggered sequence of uplink NDPs that are used for implicit channel estimation before each multi-user transmission. Since the channel is estimated implicitly, there are no levels of feedback compression to display.

Opportunistic Proposal for 802.11af. In this case, there is no CSI overhead to multi-user transmissions. We explore three regions of operation for an opportunistic base station:

1) "Opportunistic." The best-case performance assuming all CSI is available opportunistically and there is no beamforming penalty for using stale CSI.

2) "Opportunistic with Bootstrap." An alternative fallback mode where at most one user terminal has stale CSI and the base station sends a single packet to that user terminal before each multiuser transmission in order to implicitly refresh its CSI. This can be viewed as a way of quickly bootstrapping opportunistic CSI to a user terminal that previously was inactive.

3) "Opportunistic with Stale CSI". A trace-driven lower bound on opportunistic performance based on our environmental measurement traces. We assume that CSI is refreshed opportunistically every second. According to our empirical results, this would result in less than 10% reduction in achievable sum-rate in an environment with static user terminals. Thus, we reduce the throughput of the best-case opportunistic scenario by the requisite amount, presenting a more fair approximation of how an implemented opportunistic system might perform.

In each case, all ACKs are staggered as per the 802.11af specification. For tractability, transmissions are assumed to be successful, requiring no retransmissions, and only downlink data flows are considered. To account for overhead amortization achievable by frame aggregation, we varied the multi-user frame aggregation number from 1 to 64 in a 4×4 system where all user terminals have only a single antenna. While we expect that increased aggregation will generally decrease the efficiency of channel sounding reduction protocols, it also determines crossover points in terms of protocol performance. For the most basic modulation and coding scheme (MCS) selection with no frame aggregation, we observed a moderate performance gap between implicit channel sounding methods (opportunistic, implicit) and the current explicit 802.11af policy. An opportunistic sounding policy would increase throughput at best by 31%, while an implicit sounding policy would increase throughput by 21% over explicit 802.11af. However, as the aggregation rate increases, these alternatives rapidly converge.

When higher MCS selections are chosen, the relative sounding overhead increases, thus increasing the importance of the sounding policy. For the maximum MCS selection supported by 802.11af, sounding overhead is much more costly because, when the system could otherwise be operating at high MCS rates, it is sending CBFRs, polling packets, and ACKs at the base rate for robustness. In these circumstances, opportunistic sounding can improve throughput by 186% and implicit sounding can improve by 94% without frame aggregation.

When frame aggregation is taken into account, the performance of the opportunistic sounding policy (with stale CSI) is strictly better than explicit 802.11af up to 35 aggregated frames. However, it barely out-performs implicit sounding at low aggregation (fewer than 10 frames) and then performs significantly worse at higher frame aggregations. We conclude that for a low number of spatial streams, opportunistic channel sounding has approximately equivalent performance compared to implicit channel sounding and potentially worse performance when considering beamforming error from stale CSI. However, both opportunistic and implicit channel sounding offer significant throughput gains over the current explicit 802.11af standard.

One potent advantage of opportunistic sounding is that it can still be employed when user terminal cooperation is not available for implicit sounding (such as for equipment that complies with the current 802.11af standard). A system design that leverages this observation would utilize opportunistic CSI when per user downlink traffic queues are below 3-52 MB, depending on the current MCS, and then revert to explicit sounding when queues exceed that size and sounding overhead can be sufficiently amortized. For legacy 802.11a/b/g/n devices that do not report any CSI, only opportunistic CSI would be available and the decision is made between multi-user and single-user transmission modes only.

Another potent advantage of opportunistic sounding occurs when the system scales to ever higher numbers of base station and user terminal antennas. At higher scales, protocol collapses occur for explicit sounding and even implicit sounding. We analyzed a 32×16 MU-MIMO system and observed that indeed, explicit channel sounding suffers severely from protocol congestion due to the high number of spatial streams and amount of explicit data that is transmitted to the base station to report CSI. For low MCS rates and frame aggregation below 18 frames, opportunistic sounding (with stale CSI) out-performs even implicit sounding, given the number of user terminals involved in each transmission. At the maximum supported MCS, strict relationships emerge between the sounding policies, since CSI overhead dominates any other effects at this scale. When channel sounding becomes extremely expensive, the use of opportunistic CSI is able to offer significant throughput gains over implicit sounding, ranging from 112% with no frame aggregation, to 18%, at maximum aggregation, even when considering the penalty from stale CSI. Explicit sounding should be avoided altogether.

A limiting factor for MU-MIMO systems is mobility. We conducted the most extensive fully mobile MU-MIMO channel measurement campaign ever reported, including high time-frequency resolution traces across the UHF, 2.4 GHz, and 5 GHz bands in diverse environments. Guided by these measurements, we devised a practical mobility detection and pilot scheduling system which dynamically adapts to user mobility. This system has negligible impact on performance in mobile environments, while increasing performance in static environments by over 150% due to eliminated channel sounding overhead. Environmental mobility was found to have minimal impact on performance, whereas user mobility can cause drastic performance fluctuations on the order of milliseconds. Furthermore, we found that users are typically either stationary or mobile for extended periods of time.

In order to classify users as either stationary or mobile, we devised a metric which accurately determines the mobility of users. Leveraging this mobility classification, we devise a pilot scheduling system which ensures accurate CSI for mobile users, while avoiding the unnecessary overhead of collecting CSI for stationary users. We simulated this pilot scheduling system on our channel traces and showed that it has a negligible performance impact mobile topologies, while increasing performance by over 150% in stationary topologies by removing CSI collection overhead. The system is able to track stationary and mobile users independently, and quickly adapt to changes in mobility.

Characterizing the impact of mobility on MU-MIMO performance depends on many factors including user speed, frequency, number of base station antennas, the beamformer, the environment, the SNR, and more. In general, faster movement, higher carrier frequency, and more base station antennas each result in a greater reduction in capacity with user mobility. Beamformers that suppress inter-user interference, such as zero-forcing or MMSE, are also much more affected by mobility; this is because when users move they are not only moving out of the beam of their intended signal, but also out of the interference null created by the base station, quickly degrading their Signal-to-Interference-plus-Noise Ratio (SINR). Based on our channel measurements, we found that at 2.4 GHz users with pedestrian mobility can suffer more than a 50% decrease in capacity in as little as 10 ms.

Mobility may be determined on a per-user basis, e.g., by using their CSI and the Error-Vector Magnitude (EVM) of their beamformed channel. Our extensive channel measurements show that environmental movement, including the movement of other users, typically has minimal impact on a user's performance, enabling each user to be treated independently. Regardless, the metric proposed below does detect environmental mobility, and will classify users as mobile given a strong enough performance impact from this mobility.

We determine user mobility based on the correlation of current CSI with previous CSI, when available, and EVM of the beamformed channel otherwise. We have found that stationary environments are long-term stable and have very little deviation of EVM or correlation. The correlation used here is the instantaneous normalized correlation of the user's 1×M CSI vector, h, between two time points, $t_0$ and $t_f$, defined as:

$$C_{f,0} = \frac{|h_{t_f} \cdot h_{t_0}^*|}{|h_{t_f}| \cdot |h_{t_0}^*|}.$$

This value is directly related to the signal strength in the beamformed channel, represented by a value ranging between 0 and 1, wherein 1 represents no change in the channel and 0 represents complete orthogonality from the users' previous location. When the system accounts for the usage of multiple frequency bins, as in Orthogonal Frequency-Division Multiplexing (OFDM), a frequency-averaged normalized correlation may be employed. This may be calculated as:

$$\overline{C_{f,0}} = \frac{1}{l} \sum_{i=1}^{l} \left[ \frac{|h_{t_f} \cdot h_{t_0}^*|}{|h_{t_f}| \cdot |h_{t_0}^*|} \right]_i,$$

where l is the number of frequency bins. Alternatively, to reduce the influence of weaker frequency bins on the calculation, the frequency-averaged normalized correlation may preferably be calculated as:

$$\overline{C_{f,0}} = \frac{\sum_{i=1}^{l} [|h_{t_f} \cdot h_{t_0}^*|]_i}{\sum_{i=1}^{l} [|h_{t_f}| \cdot |h_{t_0}^*|]_i}.$$

The foregoing calculations may exploit all available time and frequency CSI information. Alternatively, to reduce computational overhead, subsets may be employed. For example, the correlations may be determined for every-Nth frame and/or every-Nth frequency bin. A variety of subsampling strategies may be employed to reduce computational overhead while minimizing impact on the effectiveness of mobility detection.

Note that while stationary users have a stable correlation, there is an expected offset from the ideal value of 1. This offset is caused by noise, which causes imperfect correlation. Setting a simple threshold on the correlation is not believed sufficient to robustly determine mobility; fortunately, stationary users have a relatively stable noise level. Thus, our metric leverages deviation from the mean of the correlation of the last n CSI values to determine mobility at frame f:

$$M_f = \left| C_{f,f-n} - \frac{1}{n} \sum_{j=1}^{n-1} C_{f-n,f-j} \right|$$

(Where multiple frequency bins are employed, the frequency-averaged normalized correlation would be used in place of the normalized correlation in the above equation.) In certain contemplated alternative embodiments, the mobility is calculated using a weighted average and/or an L2 norm. The weighted average may be used, e.g., to reduce edge effects of the mean calculation. In any event, this mobility at frame f, $M_f$, is then compared to a threshold, $\gamma$, to determine if the user should be classified as mobile or stationary. As an illustrative example, the threshold might be set at 0.9. This metric is very functional, as it does not depend on noise or signal strength, and has a constant range of 0 to 1, enabling a constant threshold to work well across environments.

Alternative measures of deviation can alternatively be employed. For example, the standard deviation of the past N measurements, or a subsampled version thereof, may be used. Combinations of alternative deviation measurements may also be desirable for improving mobility detection.

When CSI is not available, e.g., when the user was determined to be stationary and has not been scheduled a pilot slot, we use the EVM of the downlink beamformed channel in place of the mobility calculation to determine mobility. (Note that it is desirable to use the downlink beamformed channel, as the uplink channel for even a stationary user varies based on movement from other users.) If the EVM exceeds an expected value, then the user is determined to be mobile.

Once mobility has been determined, the pilot scheduling system is rather straightforward: CSI for users that are mobile is updated regularly, with the update period determined based on beamformer performance and the measured time and frequency coherence of the CSI. Where possible, opportunistic implicit CSI measurements are used, but if an elapsed time since a mobile user terminal's last CSI update exceeds a threshold, a pilot signal transmission from the user terminal is scheduled. Alternatively, the base station may schedule the mobile user terminal to send pilots, perhaps on a subset of frequencies, at regular time intervals. A significantly larger elapsed time threshold and frequency spacing may be employed for stationary users, or in some embodiments, users that are stationary are never scheduled to send pilots (but continue communicating EVM information to the base station). Of course, if a stationary user becomes mobile, the threshold is reduced and/or they begin sending pilots at regular intervals.

Figure 6:
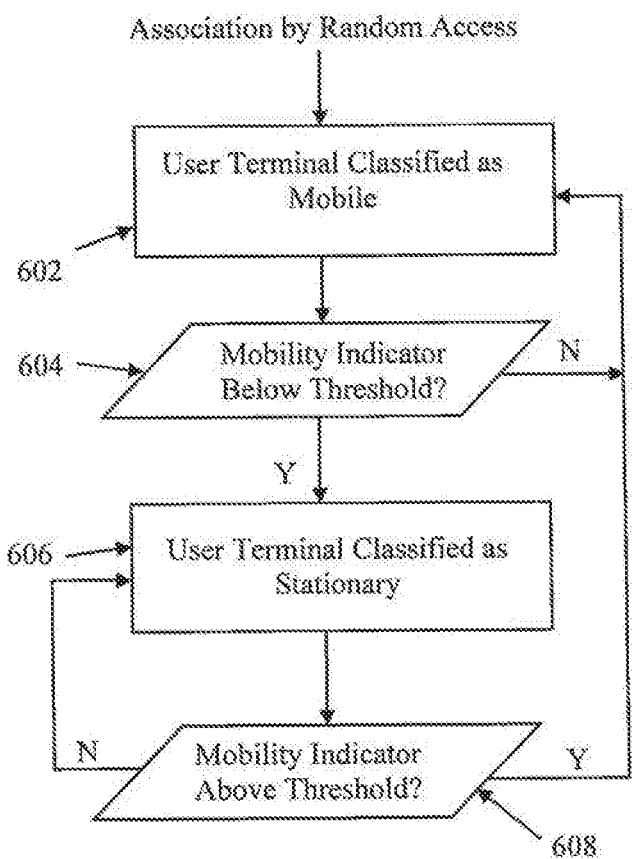
FIG. 6 is a state diagram of a mobility determination method.

FIG. 6 shows an illustrative state diagram for mobility determination for a given user terminal. When a user terminal is initially associated with a base station, e.g., via random access, the base station classifies the user terminal as "mobile" in block 602. The base station monitors the mobility indicator (or EVM surrogate) and compares it to a threshold in block 604. The calculation and comparison may occur on a frame-by-frame basis. If the mobility indicator falls below the threshold, then in block 606 the base station classifies the user terminal as "stationary". Otherwise, the user terminal continues to be classified as "mobile" in block 602. The base station continues to monitor the mobility indicator and compares it to the threshold (or a nominally-adjusted threshold to provide some hysteresis) in block 608. If the mobility indicator exceeds the threshold, then in block 602 the base station classifies the user terminal as "mobile". Otherwise the user terminal continues to be classified as "stationary" in block 606.

The base station may employ this state diagram when scheduling pilots. When a user terminal first becomes active, e.g. by sending a random access request, they will be immediately scheduled to send a pilot every frame until their mobility is determined based on normalized CSI correlation. Notably, this correlation, along with the EVM of the beamformed channel, of each user will fluctuate based on noise and interference. Thus, multiple frames are preferably employed to determine whether the user terminal is mobile, or is just using a noisy channel. If the correlation and EVM stay within a constant envelope, then the user terminal may be determined to be stationary, and may thus be no longer required to send pilots every frame. If the correlation fluctuates significantly between frames then the user terminal may be determined to be mobile, and (at least in some embodiments) continues sending pilots every frame until they are detected as stationary. (In other embodiments, where time and frequency coherence of the CSI are measured, the pilots may be scheduled at suitable frequency and time spacings.) When a stationary user terminal's EVM fluctuates outside a multiple of the envelope computed when they were determined to be stationary, or when there is a dropout, then the user terminal will be scheduled to send pilots in a dedicated slot (first using a lower modulation rate over the beamformed channel, then, if that fails, typical paging and random access methods), at which point the process repeats itself.

In a frame-based simulation of performance for a mix of stationary and mobile user terminals, the base station was presumed to collect CSI at the beginning of every frame. In the naive system CSI is collected for every user every frame, whereas for comparison our proposed system which only collects CSI for the mobile users, as determined each frame using the mobility calculations set forth above. Our proposed system shows at most a 3% loss because users occasionally use stale CSI (CSI collection is suppressed for stationary users). However, the proposed system quickly demonstrates a dramatically improved performance as the number of users increases.

Note that the mobility classes may be extended. Some system embodiments may have multiple mobility thresholds to distinguish, e.g., pedestrians from vehicular passengers, and may provide different schedules or deadlines for refreshing the CSI measurements. As observed above, user mobility is not related; one user moving rarely affects the channel of other users, and when it does, the effect is ephemeral. Thus, user mobilities can safely be calculated independently. Based on experimental results, two (mobile, stationary) or at most three (vehicle, pedestrian, stationary) mobility classifications are expected to be sufficient for near optimal performance, though of course more may be used. It may be preferred to collect CSI measurements for every frame (particularly at higher frequencies) for mobile users, since the channel evolves on a wavelength-by-wavelength basis.

Figure 7:
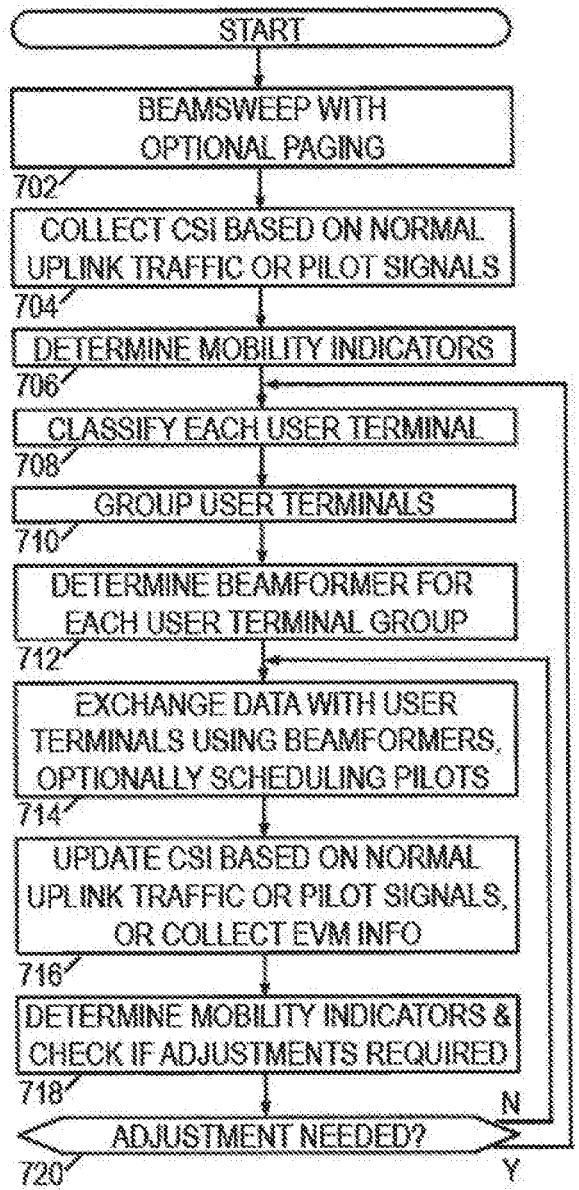
FIG. 7 is a flow diagram of an illustrative wireless communications method.

In view of the foregoing, FIG. 7 is a flow diagram of an illustrative wireless communications method. After performing the measurements needed to determine the reciprocity calibration coefficients previously discussed, the method begins in block 702 with the base station performing a beam sweep, sending a beacon that provides the user terminals with time-frequency synchronization and the base station identifier. The synchronization process assigns time-frequency slots to the user terminals, optionally reserving one or more slots for use by terminals needing to associate themselves with the base station via a random access protocol. If the base station needs to page any user terminals, the paging sequence will be sent concurrently with the beam sweep.

In block 704, the user terminals of a scheduled system (such as LTE), operating in orthogonal time-frequency slots, may send pilot signals to the base station, which the base station uses to measure estimate the uplink CSI. In such systems, the mobility classification may be taken into account for pilot scheduling, as discussed previously. Pilot scheduling may also or alternatively be based on time-frequency coherence of the channels assigned to the various user terminals.

However, in some system embodiments (e.g., CSMA-like networks such as IEEE 802.11af), normal uplink traffic is sufficiently orthogonal that the base station can opportunistically collect uplink CSI measurements based on, e.g., packet headers, obviating the need for scheduling pilot signals. Variations may include the following: In the CSMA-based CSI acquisition scheme, the CSI can be updated by sending a "bootstrap" packet to the user terminal that needs updated CSI, thereby triggering a response that enables the base station to obtain updated estimates of the uplink CSI. This bootstrap packet could be the next packet in the queue for that user terminal, it could be the shortest packet in the client's queue, or it could be a dummy packet such as an 802.11 idle client probe. The latter may be most suitable in the case that there are no packets queued for that user terminal.

In block 706, the base station analyzes the CSI measurements to determine a mobility indicator for each user terminal, e.g., by measuring a deviation of normalized correlation from a mean value. At least some contemplated embodiments may additionally or alternatively employ a surrogate mobility indicator such as, e.g., error vector magnitude, bit-error rate, frame drop, signal noise ratio, or signal to interference ratio. In some contemplated alternative embodiments, rather than relying on the surrogate mobility indicator for stationary user terminals (which may not have any pilots being scheduled), the stationary user terminals may be scheduled to send very abbreviated pilot signals (e.g., using only a single subcarrier, and only periodically, i.e., not in every frame) which have negligible overhead. Our experiments indicate that such subsampling in time and frequency nevertheless yields a very robust mobility detection.

Such abbreviated pilots may even be useful for mobile user terminals, as the frequency response of the channel is largely determined by multipath effects in the propagation environment. (For example, user terminals that have a line of sight channel to the base station have an almost flat frequency response, whereas user terminals close to obstructions and reflectors may have an extremely varying response. A base station that distinguishes these cases may provide more efficient scheduling of pilots using Orthogonal Frequency-Division Multiple Access (OFDMA) and scheduling each user only the pilot duration and frequency resolution needed to collect high quality channel measurements.

In block 708, a mobility classification (e.g., mobile or stationary) is determined for each user terminal. As described previously, these classifications enable the base station to drastically improve the efficiency of MU-MIMO by eliminating unnecessary CSI collection for user terminals whose channels are not changing.

In block 710, the base station optionally groups the user terminals. In block 712, each group will be assigned a corresponding steering transform (i.e., "beamformer"), and the grouping may be performed with multiple consequent goals in mind. For example, the grouping may be performed at least in part based on mobility classification. The steering transform for any group containing only stationary user terminals will be stable and thus need not be frequently redetermined. Conversely, groups containing one or more mobile user terminals may preferably have their corresponding steering transforms updated frequently based on the freshest available CSI measurements. As another example, user terminals positioned near to each other may not have sufficiently orthogonal channel properties to be well served by spatially diverse beams. Such user terminals may be placed in different groups so that time or frequency division can be employed to minimize interference.

In block 712, the base station maps the groups to distinct time and/or frequency slots and, for each group, determines a corresponding steering transform to be applied to the downlink and uplink signals for the user terminals in that group. In some contemplated embodiments, the beamformers (zero-forcing, conjugate) and MCS rate selections may be chosen based on estimated capacity. Beamformers can alternatively be chosen based on the expected stability of the group, so that the overhead associated with zero-forcing can be amortized over the longer usage period associated with stationary user terminals, and the computational burden for frequently-redetermined steering transforms for the mobile user terminals reduced by using the conjugate method. Over time, these choices can be tuned and refined to further improve achieved capacity.

In block 714, the base station applies the steering transform to convert between base-station-antenna specific uplink/downlink signals and user-terminal specific uplink/downlink data streams. Where available, EVM or other performance measurements may be collected from user terminals classified as stationary. Where needed, the base station may use the downlink communications to schedule pilot signals, e.g., from mobile user terminals or those user terminals for which the CSI measurements are determined to be stale.

In block 716, the base station updates CSI measurements based on normal uplink traffic (e.g., known patterns in packet headers), previously scheduled pilot signals, or the collected EVM or downlink performance measurements. In block 718 the base station updates the mobility indicators based on the updated CSI information, or optionally updates the surrogate measures for mobility (e.g., comparing EVM to a threshold). The base station then determines if any user terminals need to be reclassified in terms of mobility and/or whether the user terminal grouping needs to be redetermined. Based on checking whether an adjustment is needed in block 720, the method implemented by the base station returns to block 708 (adjustment is needed) or block 714 (no adjustment needed).

Embodiments described herein are included to demonstrate particular aspects of the present disclosure. It should be appreciated by those of skill in the art that the embodiments described herein merely represent exemplary embodiments of the disclosure and should not be taken as limiting on the scope of the disclosure or the claims. Those of ordinary skill in the art should, in light of the present disclosure, appreciate that many changes can be made in the specific embodiments described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. Numerous such alternative forms, equivalents, and modifications will become apparent to those skilled in the art once the above disclosure is fully appreciated. For example, the techniques discussed herein can be applied to any MU-MIMO wireless system. Additionally, they can be applied to wireless localization and RFID tags, including internet of things (IoT) devices and controls. It is intended that the claims be interpreted to embrace all such alternative forms, equivalents, and modifications.

What is claimed is:

1. A wireless communications base station that comprises:
   an array of multiple antennas to exchange uplink and downlink signals with spatially-distributed user terminals;
   multiple transmit chains, each coupled to one of the multiple antennas in said array by a respective transceiver that also couples said one of the multiple antennas to a respective one of multiple receive chains, wherein each receive chain derives estimated uplink channel response coefficients from wireless uplink signals via implicit opportunistic channel sounding;
   wherein implicit opportunistic channel sounding is based on CSI (channel state information) that is either available or unavailable;
   wherein, when historical implicit CSI is available and "fresh," the AP forms user groups and calculates precoding weights for the optimal multi-user transmission group determined by a MAC (Medium Access Control) scheduler;
   wherein, when implicit CSI is unavailable or "stale", either (1) a single downlink frame for the stale CSI is de-queued and transmitted by the AP and a subsequent response or acknowledgement will then provide an update of the implicit CSI or (2) if no traffic is available, legacy, implicit methods are employed; and
   a controller that determines (1) a steering transform, based at least in part on the estimated uplink channel response coefficients to estimate a reciprocal downlink channel, to produce antenna-specific downlink signals for each antenna in the array and (2), a mobility indicator, based at least in part on the estimated uplink channel response coefficients, to schedule an uplink pilot signal from one or more of the user stations, and re-derive the estimated uplink channel response coefficients and re-determine steering transform therefrom;
   wherein transmit beams are formed for delivering wireless downlink signals to said spatially-distributed user terminals.

2. The base station of claim 1, wherein the controller compares the estimated uplink channel response coefficients to values used for determining the steering transform and re-determines the steering transform upon detecting a sufficient difference.

3. The base station of claim 1, wherein the estimated uplink channel response coefficients are determined on a per user terminal antenna basis for each antenna in said array, and wherein the controller monitors, for each user terminal antenna, an elapsed time since that user terminal antenna's estimated uplink channel coefficients were derived.

4. The base station of claim 3, wherein upon determining that the elapsed time exceeds a threshold, the controller refreshes the estimated uplink channel response coefficient for that user terminal antenna by initiating a wireless packet exchange with that user terminal antenna.

5. The base station of claim 4, wherein the controller derives, from the estimated channel response coefficients, a mobility indicator for each user terminal antenna, and wherein the threshold depends on the mobility indicator for that user terminal antenna wherein:
   mobility is determinable on a per-user basis; and
   user is either stationary or mobile;
   wherein mobility may be derived by correlating current CSI with historical CSI, through available time and frequency CSI, Error-Vector Magnitude (EVM), or a combination thereof.

6. The base station of claim 3, wherein upon determining that the elapsed time exceeds a threshold, the controller designates that user terminal antenna as inactive and re-determines the steering transform for active user terminal antennas.

7. The base station of claim 1, wherein each of the multiple transmit chains and multiple receive chains provide OFDM or SC-FDMA modulation and demodulation, respectively, and wherein the estimated uplink channel response coefficients are derived as a function of base station antenna, user terminal antenna, and frequency bin.

8. An 802.11-compatible wireless network communications method that comprises:
   exchanging wireless uplink and downlink signals with spatially-distributed user terminals;
   opportunistically deriving, via implicit opportunistic channel sounding, for each combination of user terminal antenna and base station antenna, an estimated uplink channel response coefficient from packet headers in the wireless uplink signals;
   wherein implicit opportunistic channel sounding is based on CSI (channel state information) that is either available, and fresh, or unavailable, and stale, wherein:
   when historical implicit CSI is available and "fresh," the AP forms user groups and calculates precoding weights for the optimal multi-user transmission group determined by a MAC (Medium Access Control) scheduler;
   when implicit CSI is unavailable or "stale", either (1) a single downlink frame for the stale STA is de-queued and transmitted by the AP to update CSI or (2) if no traffic is available, legacy implicit methods are employed;
   determining a steering transform based at least in part on the estimated uplink channel response coefficients; and
   applying the steering transform to spatially-distinct downlink signals to produce antenna-specific downlink signals for each antenna of a multi-antenna base station, thereby forming beams for delivering wireless downlink signals to the spatially-distributed user terminals.

9. The method of claim 8, wherein said estimated uplink channel response coefficients are derived on a per user terminal antenna basis for each base station antenna and wherein the method further comprises:
monitoring, for each user terminal antenna, an elapsed time since that user terminal antenna's estimated uplink channel coefficients were derived; and
upon determining that the elapsed time exceeds a threshold, performing at least one action in a set consisting of: designating that user terminal antenna as inactive; or
initiating a packet exchange with that user terminal antenna to refresh the estimated uplink channel response coefficients;
and
re-determining the steering transform for active user terminal antennas.

10. The method of claim 9, further comprising:
deriving, from the estimated channel response coefficients, a mobility indicator for each user terminal antenna, wherein mobility is determined based on the correlation of current CSI with previous CSI, when available, and EVM of the beamformed channel otherwise, and setting the threshold based at least in part on the mobility indicator for that user terminal antenna.

11. The method of claim 8, further comprising:
comparing the estimated uplink channel response coefficients to values used for determining the steering transform; and
upon detecting a sufficient difference, re-determining the steering transform.

12. A wireless communications base station that comprises:
an array of multiple antennas to exchange uplink and downlink signals with spatially-distributed user terminals;
multiple transmit chains, each coupled to one of the multiple antennas in said array by a respective transceiver that also couples said one of the multiple antennas to a respective one of multiple receive chains, wherein each receive chain derives estimated uplink channel response coefficients from the wireless uplink signals; and
a controller that determines a steering transform based at least in part on the estimated channel response coefficients,
wherein the transmit chains apply the steering transform to spatially-distinct downlink signals to produce antenna-specific downlink signals for each antenna in the array,
wherein the controller determines, based at least in part on the estimated channel response coefficients, a correlation of current versus previous CSI, Error-Vector Magnitude (EVM), or a combination thereof, a mobility indictor for each user terminal, and
wherein the controller schedules, based on the mobility indicators, at least one action in a set consisting of: no action, transmission of uplink pilot signals from at least some of the user terminals re-deriving the estimated uplink channel response coefficients and redetermining the steering transform.

13. The base station of claim 12, wherein the receive chain derives estimated uplink channel response coefficients based on the pilot signals in the wireless uplink signals, and wherein the controller schedules the pilot signals based on aid mobility indicator.

14. The base station of claim 13, wherein each of the multiple transmit chains and multiple receive chains provide OFDM modulation and demodulation, respectively, and wherein the estimated uplink channel response coefficients are derived as a function of base station antenna, user terminal antenna, and frequency bin.

15. The base station of claim 14, wherein the controller schedules the uplink pilot signals for subsampling with respect to the frequency bins.

16. The base station of claim 15, wherein the controller sets a degree of subsampling based at least in part on said mobility indicator.

17. The base station of claim 12, wherein said mobility indicator is represented by the difference, relative to a baseline value, of a normalized dot product of current and past estimated uplink channel response coefficients for a given user terminal antenna.

18. The base station of claim 17, wherein the baseline value is a moving average of previous normalized dot products.

19. The base station of claim 18, wherein each of the normalized dot products, including the previous normalized dot products, correlate estimated uplink channel response coefficients separated by a fixed time delay.

20. The base station of claim 17, wherein the normalized dot product is a ratio between a dot product averaged over frequency bins and a magnitude product averaged over the frequency bins.

21. The base station of claim 17, wherein the normalized dot product is an average ratio between a dot product and a magnitude product, the ratio being averaged over frequency bins.

22. The base station of claim 12, wherein the controller groups user terminals based at least in part on the mobility indicators, and wherein as part of determining the steering transform, the controller determines a steering transform for each user terminal group.

23. The base station of claim 12, wherein at least some of the spatially-distributed user terminals provide said uplink signals and accept said downlink signals in compliance with IEEE Std 802.11 (2012).

24. A wireless network communications method that comprises: exchanging wireless uplink and downlink signals with spatially-distributed user terminals;
deriving, for each combination of user terminal antenna and base station antenna, an estimated uplink channel response coefficient from the wireless uplink signals;
determining a steering transform based at least in part on the estimated uplink channel response coefficients;
applying the steering transform to spatially-distinct downlink signals to produce antenna-specific downlink signals for each antenna of a multi-antenna base station, thereby forming beams for delivering wireless downlink signals to the spatially-distributed user terminals;
determining a mobility indictor, derived on a per-user basis based on the correlation of current CSI with previous CSI, when available, and Error-Vector Magnitude (EVM) of the beamformed channel, otherwise, for each user terminal based at least in part on the estimated channel response coefficients; and
scheduling, based on the mobility indicators, at least one action in a set consisting of:

transmission of uplink pilot signals from at least one of the user terminals re-deriving the estimated uplink channel response coefficients, and re-determining the steering transform.

25. The method of claim 24, wherein said estimated uplink channel response coefficients are based on the pilot signals in the wireless uplink signals and wherein said scheduling includes obtaining periodic pilot signals at intervals based on the mobility indicators based on current CSI versus previous CSI, when available, and Error-Vector Magnitude (EVM) of the beamformed channel, otherwise.

26. The method of claim 24, wherein the mobility indicator represents a difference, relative to a baseline value, of a normalized dot product of current and past estimated uplink channel response coefficients for a given user terminal antenna, and wherein the baseline value is a moving average of previous normalized dot products.

27. The method of claim 26, wherein the normalized dot product is a ratio between a dot product averaged over frequency bins and a magnitude product averaged over the frequency bins.

28. The method of claim 26, wherein the normalized dot product is an average ratio between a dot product and a magnitude product, the ratio being averaged over frequency bins.

* * * * *